(12) United States Patent
Yeung et al.

(10) Patent No.: US 7,388,586 B2
(45) Date of Patent: Jun. 17, 2008

(54) METHOD AND APPARATUS FOR ANIMATION OF A HUMAN SPEAKER

(75) Inventors: Minerva Yeung, Sunnyvale, CA (US); Ping Du, Shanghai (CN); Chao Huang, Shanhai (CN)

(73) Assignee: Intel Corporation, Santa Clara, CA (US)

( * ) Notice: Subject to any disclaimer, the term of this patent is extended or adjusted under 35 U.S.C. 154(b) by 365 days.

(21) Appl. No.: 11/095,492

(22) Filed: Mar. 31, 2005

(65) Prior Publication Data

US 2006/0221084 A1    Oct. 5, 2006

(51) Int. Cl.
G06T 15/70 (2006.01)
G06K 9/68 (2006.01)

(52) U.S. Cl. .................. 345/473; 345/951; 345/956; 382/218

(58) Field of Classification Search ............... 345/951, 345/956, 957
See application file for complete search history.

(56) References Cited

U.S. PATENT DOCUMENTS

| | | | | |
|---|---|---|---|---|
| 5,613,056 | A * | 3/1997 | Gasper et al. | 345/473 |
| 5,880,788 | A * | 3/1999 | Bregler | 348/515 |
| 6,154,222 | A * | 11/2000 | Haratsch et al. | 345/473 |
| 6,326,971 | B1 * | 12/2001 | Van Wieringen | 345/474 |
| 7,123,262 | B2 * | 10/2006 | Francini et al. | 345/473 |
| 7,168,953 | B1 * | 1/2007 | Poggio et al. | 434/185 |

OTHER PUBLICATIONS

Jörn Ostermann, "Animation of Synthetic Faces in MPEG-4," Jun. 8, 1998, Computer Animation 98 Proceedings, p. 49-55.*
Fu Jie Huang, Tsuhan Chen, "Real-Time Lip-Synch Face Animation Driven by Human Voice," Dec. 7, 1998, IEEE Second Workshop on Multimedia Signal Processing, p. 352-357.*
Thomas S. Huang, "Real-Time Speech-Driven Face Animation with Expressions using Neural Networks," Jul. 2002, IEEE Transactions on Neural Networks, vol. 13, No. 4, p. 916-927.*
Wen Gao, Yiqiang Chen, Rui Wang, Shiguang Shan and Dalong Jiang, "Learning and Synthesizing MPEG-4 Compatible 3-D Face Animation From Video Sequence," Nov. 2003, IEEE Transactions on Circuits and Systems for Video Technology, vol. 13, No. 3, p. 1119-1128.*
Pengyu Hong, Zhen Wen, Thomas S. Huang, "Real-Time Speech-Driven Face Animation with Expressions using Neural Networks," Jul. 2002, IEEE Transactions on Neural Networks, vol. 13, No. 4, p. 916-927.*
"Advanced MPEG4 Animation System", *ViSiCAST European Project*, 20 pages.
Ahlberg, Jorgen, "An Experiment on 3D Face Model Adaptation using the Active Appearance Algorithm", 9 pages.
Lee, Yuencheng, et al., "Realistic Modeling for Facial Animation", *Proceedings of Siggraph 95*, 8 pages.

* cited by examiner

*Primary Examiner*—Ulka Chauhan
*Assistant Examiner*—Jason M Repko
(74) *Attorney, Agent, or Firm*—Blakely, Sokoloff, Taylor & Zafman LLP

(57) ABSTRACT

Methods and apparatus for representing speech in an animated image. In one embodiment, key point on the object to be animated are defined, and a table of trajectories is generated to map positions of the key points over time as the object performs defined actions accompanied by corresponding sounds. In another embodiment, the table of trajectories and a sound rate of the video are used to generate a frame list that includes information to render an animated image of the object in real time at a rate determined by the sound rate. In still another embodiment, a 2D animation of a human speaker is produced. Key points are selected from the Motion Picture Expert Group 4 (MPEG4) defined points for human lips and teeth.

8 Claims, 3 Drawing Sheets

METHOD AND APPARATUS FOR ANIMATION OF A HUMAN SPEAKER

FIELD OF THE INVENTION

Embodiments are in the field of accurately animating human speakers; particular embodiments are in the field of computer animation techniques that employ linguistics principles.

BACKGROUND OF THE DISCLOSURE

Animation techniques involve creating a representation of a scene, including moving persons or things, and generating a moving picture of the scene as it changes over time. For example, cartoon animation generates a moving picture by creating hundreds or thousands of still pictures of the scene, each of which shows the scene in a different moment in time. When the still pictures are shown at an appropriate speed in chronological order, a lifelike moving picture is generated. More recently, much development has been done in the area of computer animation. Computer animated scenes involve less repetitive human hand drawing, and can be very lifelike.

One challenging aspect of animation is generating human faces as humans speak and portray different facial expressions. Various 2-dimensional (2D) and 3-dimensional (3D) animation techniques are currently used to create cartoons or video games. In general, it is difficult to scale the accuracy and efficiency of more complicated aspects of the animation, such as facial animation, using current techniques. For example, creating a highly accurate facial animation showing a human speaker using 3D methods may be possible, but may also be prohibitively expensive. It is also generally difficult to dynamically replay animation of, for example, a human speaker, and adjust the movement and sound speeds together accurately.

DETAILED DESCRIPTION

Embodiments of a method and system for generating an animated image are disclosed herein. Methods include obtaining a video of an object to be animated in which the object performs defined actions accompanied by corresponding sounds. Key points on the object to be animated are defined, and a table of trajectories is generated. The table of trajectories maps positions of the key points over time as the object performs each defined action. The table of trajectories and a sound rate of the video are used to generate a frame list that includes information to render an animated image of the object in real time at a rate determined by the sound rate.

In one embodiment, a 2-dimensional (2D) animation of a human speaker is produced. Key points are selected from the Motion Picture Expert Group 4 (MPEG4) defined points for human lips and teeth. MPEG4 is an International Organization for Standardization (ISO) standard for coded representation of digital audio and video. Actual sound video of a human speaker is analyzed to map trajectories of the key points for particular phonemes or tri-phonemes spoken. The mapped trajectories and the sound rate, or speech rate of the video are used to generate a rendering frame list from which an animated image of the speaker can be displayed. The frame list is generated in real time such that an accurate image of the speaker is adjustable to the speech rate. The 2D animation process as described herein is not limited to the specific example embodiments shown and described. For example, any body part other than lips could be animated in a similar manner. In addition, any other moving object could be animated in a similar manner after the assignment of key points. Various aspects of the 2D animation method as described are also applicable to 3D animation.

Figure 1:
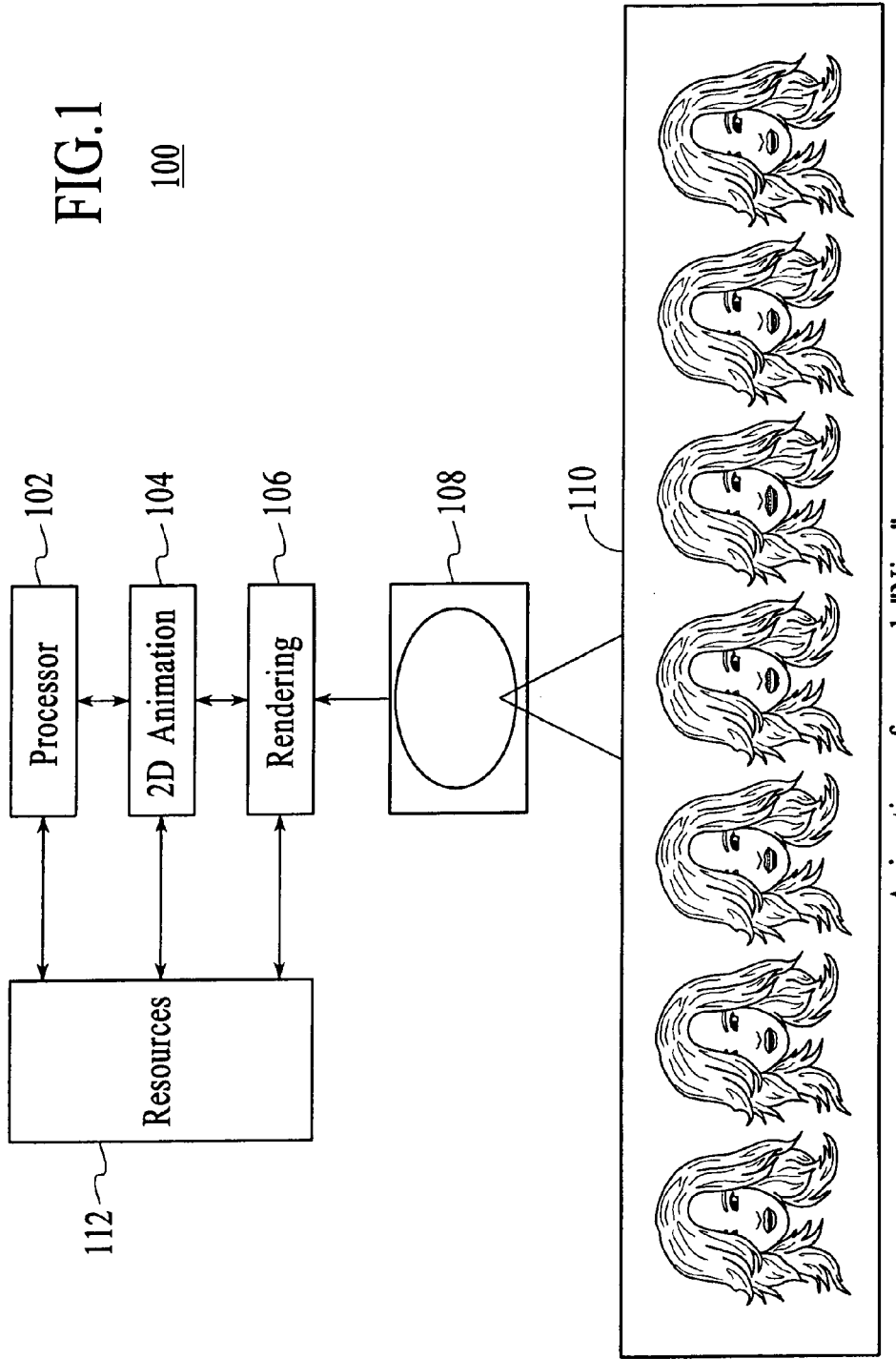
FIG. 1 is a block diagram of a system according to an embodiment.

FIG. 1 is a block diagram of a system 100 according to an embodiment. The system 100 includes a processor 102 coupled to resources 112. The processor 102 in various embodiments is a component of a personal computer, or any other processor-based wired or wireless device, such as a cellular phone or personal digital assistant. The processor 102 may be coupled through a wired or wireless network to other processors and/or resources not shown. The resources 112 include memory resources that are shared by the processor 102 and other components of the system 100. The processor 102 may also have local, dedicated memory.

A 2D animation module 104 is coupled to the processor 102 and to the resources 112. The 2D animation module 104 includes hardware and software to generate a 2D animation from video data as described in more detail below. The 2D animation module 104 generates a frame list that is output to a rendering unit 106. The rendering unit 106 renders the frame list in a known manner to display an animated image 110 on a display 108. As an example in animated image 110, an animated human speaker speaks the word "nine".

Alternatively, the entire system 100 is a component of and/or hosted on a processor-based system, including a multi-processor system in which the components of the system 100 are distributed in a variety of fixed or configurable architectures. For example, the processor 102 may include the rendering unit 106. In another embodiment, the rendering unit 106 may be a part of a graphics processing unit coupled to the processor 102. The 2D animation module may include software instructions that are stored on the shared resources 112, or on a local memory (not shown) of the processor 102. The 2D animation module may also include software instructions that are downloaded from a network to the resources 112 or the processor 102 as needed. In various embodiments, the display 108 may be remote from the system 100, and may receive the output of the rendering unit 106 via a network.

Figure 2:
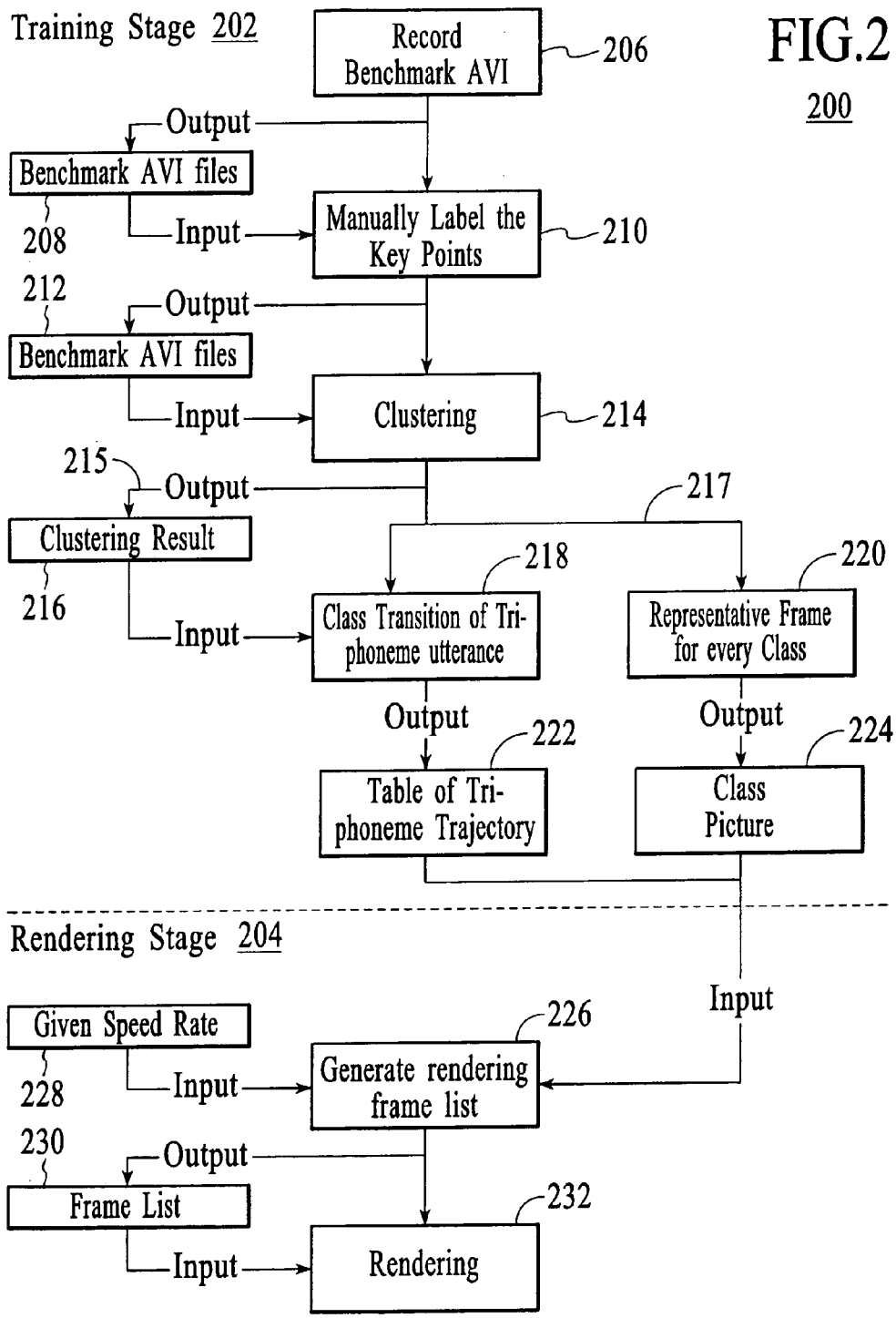
FIG. 2 is a flow diagram of a method of 2-dimensional (2D) animation according to an embodiment.

FIG. 2 is a flow diagram of a 2D facial animation process 200 according to an embodiment. Process 200 includes a training stage 202 and a rendering stage 204. Training stage 202 includes clustering similar types or shapes of lips together. Each human speaker has lips that are shaped differently. A class of lips includes multiple, similar lip shapes. At 206 one or more benchmark video files is recorded. In one embodiment, a benchmark file is an audio video interleave (AVI) file. AVI is a sound and motion picture format that conforms to the Microsoft Windows Resource Interchange File Format (RIFF) specification. Various embodiments could use other formats for the benchmark file. Recording the benchmark video files includes recording human speakers pronouncing various words or sentences.

One embodiment includes generating a word frequency list based on spoken materials of the British National Corpus (BNC), which includes about 21,000 words. Every word in the list can be split into phonemes. A phoneme is the smallest contrastive unit in the sound system of a language. According to an embodiment, three phonemes are combined to create tri-phonemes, and a tri-phoneme frequency list is generated. Based on the tri-phoneme list, a relatively small set of words is selected to cover as many tri-phonemes as possible. In one embodiment, 301 words are used. The 301 words include over 86% of the tri-phonemes. This covers about 20,000 words in the BNC word frequency list. Thus, the human speaker speaks only 301 words for the training phase 202. This makes the training phase 202 very economical. In various embodiments, more or fewer words could be chosen for the training phase 202.

The output of 206 is benchmark AVI files 208. The benchmark AVI files 208 are input to a process 210 of labeling key points of the speaker's lips. In one embodiment, the points are manually labeled, while in other embodiments, this operation is performed automatically. According to an embodiment, a set of key points on lips is selected for the clustering of lip shape classes. The selection of key points impacts the training phase in both quality and quantity. In an embodiment, a subset of those points defined in the Motion Picture Expert Group 4 (MPEG4) standard is chosen as key points.

The process 210 includes labeling key points according to the MPEG4 standard and also noting how the key points transition across different tri-phonemes as the speakers pronounce the tri-phonemes. More specifically, key point transition information, which includes identification of the key points and their movements through space as the tri-phonemes are pronounced, is recorded. In one embodiment, to represent lip or mouth movement, five features are defined from the key points. The five features are: height of outer lip/width of outer lip; height of inner lip/width of inner lip; height of upper teeth/height of outer lip; height of lower teeth/height of outer lip; and height of inner lip/height of outer lip.

Figure 3:
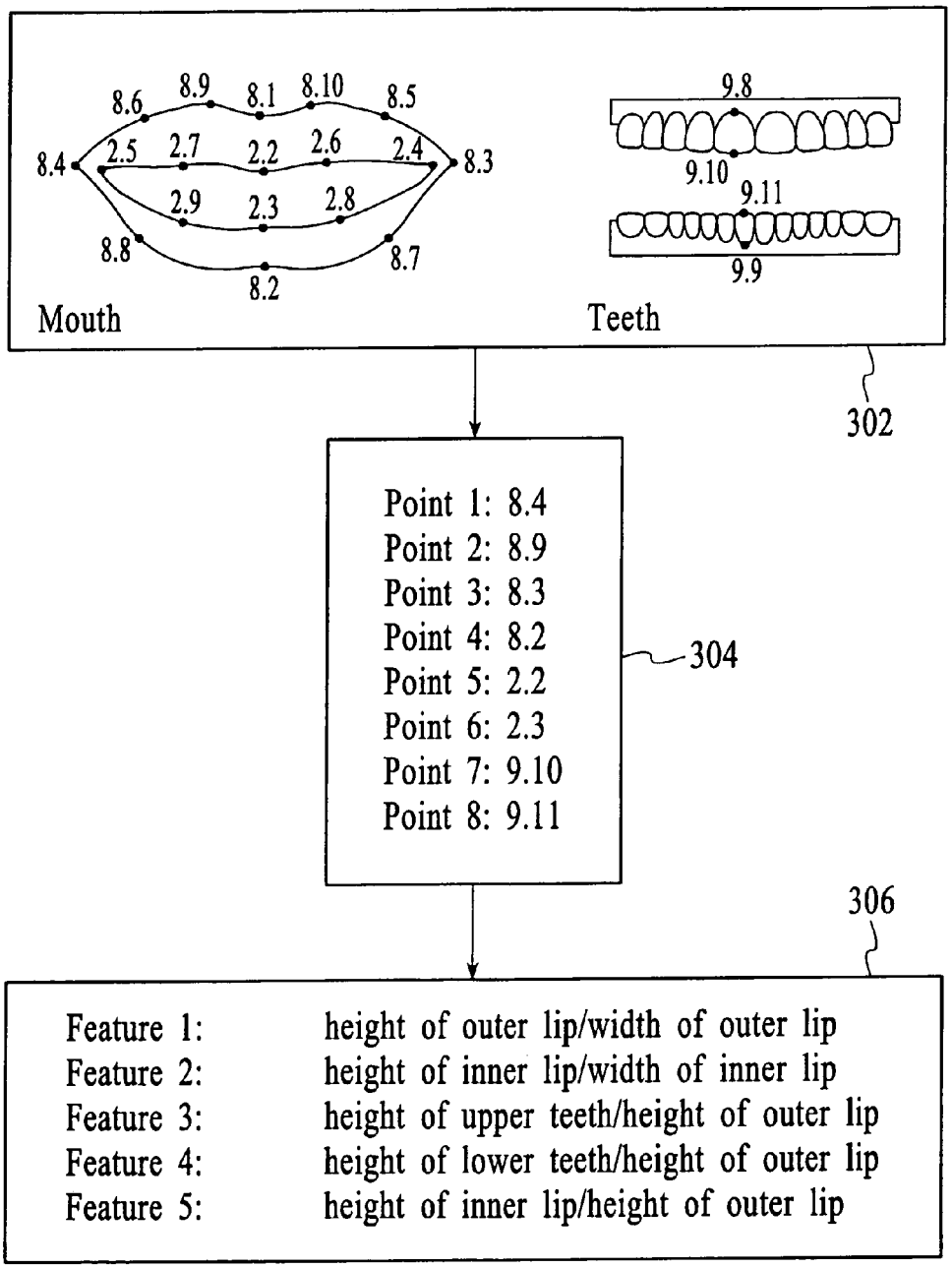
FIG. 3 is a diagram of points on the human face defined in the MPEG4 standard, and features established according to an embodiment.

FIG. 3 is a diagram showing more detail of the process 210. The MPEG4 points for the mouth and teeth 302 are the basis for the selection of eight key points 304. In one embodiment, the eight key points 304 are: Point1: 8.4; Point2: 8.9; Point3: 8.3; Point4: 8.2; Point5: 2.2; Point6: 2.3; Point7: 9.10; and Point8: 9.11. The five features 306 are established as ratios of mouth and teeth dimensions as shown.

Referring again to FIG. 2, the output of the process 210 is benchmark AVI files 212, which include the key point transition information. For any tri-phoneme, there is a different set of key point transition information for each different lip shape. In a clustering process 214, benchmark AVI files for multiple speakers are used to cluster or group similar lip shapes into classes. One output 215 of the clustering process 214 is a clustering result 216. The clustering result 216 includes a pre-defined number of classes. The pre-defined number of classes of lip shapes corresponds to a level of accuracy in the animation which is a result of the animation process 200. In general, a lower number of classes per cluster results in lower animation accuracy and lower complexity. On the other hand, a higher number of classes per cluster results in higher animation accuracy and higher complexity. Lower complexity generally includes lower hardware and software resource usage and higher relative processing speed. Higher complexity generally includes higher hardware and software resource usage and lower relative processing speed. Therefore, animation and complexity can be traded off as appropriate to particular applications or systems by adjusting the clustering result. In one embodiment, after the features listed above are determined, the furthest linkage method and Euclidean distance are used to cluster all the data and obtain a clustering result 216 of 75 different classes.

Another output 217 of the clustering process 214 is the classes themselves as represented by the benchmark AVI file 212. The clustering result 216 and the classes 217 as output by the clustering process 214 are used at 218 to observe how each class transitions through all of the tri-phoneme utterances and to generate a mapping table 222 that records the process of tri-phoneme utterance and lip class transition.

To compensate the less frequently used tri-phonemes not covered in the training stage, an algorithm generates all the tri-phonemes from the incomplete training data.

In one embodiment, the tri-phonemes are divided into three levels. A first level includes tri-phonemes that are included in the raw training data. A batch force alignment is initially run on the benchmark video files to split the video into phoneme-levels based on its audio. Then five features of every frame are classified into one pre-clustered class to get the first level tri-phonemes trajectory.

A second level includes tri-phonemes that can be mapped into the first level based on phoneme-viseme relation. A viseme is a generic facial image that can be used to describe a particular sound. A viseme is the visual equivalent of a phoneme or unit of sound in spoken language.

All the tri-phonemes are mapped into tri-visemes, and all the tri-phonemes that are not included in the first level but can be mapped into the first level through tri-visemes are determined. The class list is copied from the first tri-phoneme to its mapping second tri-phoneme. Then, a second level tri-phonemes trajectory is obtained.

A third level tri-phonemes trajectory includes all of the tri-phonemes that cannot be mapped.

The classes 217 are also used at 220 to generate a class picture. A class picture is a particular picture or lip shape that is representative of the class. In an embodiment, the class picture is an approximate average lip shape for the class.

Referring now to the rendering stage 204, a given speech rate, or rate 228 is a rate of pronunciation of tri-phonemes. The rate 228 is obtained from the natural video sound, and is the actual rate of speech of the video of the human speaker. The rate 228 is input, along with the class picture 224 and mapping table 222, to a process 226 for generating a rendering frame list.

The process 226 facilitates dynamic rendering of accurate images for different rates 228. For example, in one embodiment, the process 226 includes interpolating in order to add additional frames when the rate 228 is relatively slow so that jerkiness is minimized in the resulting animated image. If the rate 228 is faster than normal, some frames are removed so that just the key frames of the table are displayed.

According to one embodiment of the process 226, one key-frame is selected for each consonant and short vowel, and two key-frames are selected for each long vowel. The key-frames are selected from the 75 classes.

Next, the frame list is generated for the remaining tri-phonemes. Considering the times each tri-phoneme is normally spoken, one embodiment defines that every consonant has one frame, every short vowel has two frames, and every long vowel has four frames.

Thus, for every consonant the selected key-frame of the mid-mono-phoneme is directly used. For every short vowel one frame is interpolated between left-mono-phoneme and mid-mono-phoneme. For every long vowel one frame is interpolated between left-mono-phoneme and mid-mono-phoneme. In addition, one frame is interpolated between mid-mono-phoneme and right-mono-phoneme.

In one embodiment, the interpolation method includes a linear interpolation algorithm that operates on the five features, and clusters the interpolated features into the existing 75 classes.

Finally, the frame list for third level tri-phonemes trajectory is obtained. All the frame lists for each tri-phoneme are then obtained. To render mouth or lip animation at any speed, which could be calculated from a forced alignment of a speech signal or be predefined, an interpolation algorithm is employed to adjust the lip class list during the rendering stage 204.

The output of the process 226 includes frames that are input to a frame list 230. The frame list 230 is used by a rendering process 232 to generate an animated image of a human speaker pronouncing words and sentences for display.

The 2D animation process as described is scalable in that the level of accuracy can be adjusted by adjusting the number of classes of lip shapes. The 2D animation process as described is dynamic in that the lip shapes are generated in real time and can be generated at various speeds according to the rate of speech.

The 2D animation process as described herein is not limited to the specific example embodiments shown and described. For example, any body part other than lips could be animated in a similar manner. In addition, any other moving object could be animated in a similar manner after the assignment of key points. The methods described are very efficient in terms of computational burden and power usage, compared for example to 3D animation techniques. This makes the methods as described particularly useful with less powerful devices such as cellular phones and personal digital assistants (PDAs), although embodiments are not so limited. Embodiments are useful for speech and language training applications, as well as for gaming and computer graphics applications. For example, according to the embodiments described, foreign language training materials can be developed including videos for different pronunciations of foreign words. The videos are very helpful to the student in learning exactly how to form different words in the same manner as a native speaker.

Aspects of the 2D animation method and system described herein may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects of the 2D animation include: microcontrollers with memory (such as EEPROM), embedded microprocessors, firmware, software, etc. Furthermore, aspects of the 2D animation may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, etc.

It should be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of 2D animation is not intended to be exhaustive or to limit the 2D animation to the precise form disclosed. While specific embodiments of, and examples for, the 2D animation are described herein for illustrative purposes, various equivalent modifications are possible within the scope of the 2D animation, as those skilled in the relevant art will recognize. The teachings of the 2D animation provided herein can be applied to other systems and methods, not only for the systems and methods described above.

The elements and acts of the various embodiments described above can be combined to provide further embodiments. These and other changes can be made to the 2D animation in light of the above detailed description.

In general, in the following claims, the terms used should not be construed to limit the 2D animation to the specific embodiments disclosed in the specification and the claims, but should be construed to include all systems that operate under the claims. Accordingly, the 2D animation is not limited by the disclosure, but instead the scope of the 2D animation is to be determined entirely by the claims.

While certain aspects of the 2D animation are presented below in certain claim forms, the inventors contemplate the various aspects of the 2D animation in any number of claim forms. For example, while only one aspect of the 2D animation is recited as embodied in machine-readable medium, other aspects may likewise be embodied in machine-readable medium. Accordingly, the inventors reserve the right to add additional claims after filing the application to pursue such additional claim forms for other aspects of the 2D animation.

What is claimed is:

1. A computer-readable medium having stored thereon instructions, which when executed in a system cause the generation of an animated image, wherein the generation comprises:

determining a set of key points of the lips of a human speaker;

recording the positions of the key points on video data that includes the human speaker speaking chosen words;

clustering various lip shapes of the human speaker into a class of lip shape;

generating a mapping table, including mapping transitions of key points for the class of lip shape to the speaker speaking a tri-phoneme of a chosen word; and generating a frame list based on the mapping table and a speech rate from an audio, including defining multiple features from the key points, wherein a feature is a ratio of two dimensions of facial features, and generating all tri-phonemes in a set of tri-phonemes from available video data, including dividing the tri-phonemes into three levels, wherein a first level includes tri-phonemes in the set of tri-phonemes that are included in data from the video, a second level includes tri-phonemes in the set of tri-phonemes that can be mapped into the first level based on a phoneme-viseme relation, and a third level includes all of the tri-phonemes in the set of tri-phonemes that cannot be mapped.

2. The medium of claim 1, wherein generating all of the tri-phonemes further comprises, for the first level of tri-phonemes:

splitting available video data into phoneme-level data based on corresponding audio; and classifying the multiple features of each video frame into one class; and obtaining a first level tri-phoneme trajectory describing the trajectory of the key points of a class through the first level tri-phonemes.

3. The medium of claim 2, wherein generating all of the tri-phonemes further comprises, for the second level of tri-phonemes:

mapping the tri-phonemes into tri-visemes;

determining all the tri-phonemes that are not included in the first level but can be mapped into the first level through tri-visemes;

copying a class list from the first tri-phoneme to its mapping second tri-phoneme; and obtaining a second level tri-phoneme trajectory describing the trajectory of the key points of a class through the second level tri-phonemes.

4. The medium of claim 3, wherein generating all of the tri-phonemes further comprises, for the third level of tri-phonemes, determining all of the tri-phonemes that cannot be mapped.

5. A system for animating an image, the system comprising:

a processor; and a 2D animation module coupled to the processor, the 2D animation module to receive video data and corresponding audio of a human speaker speaking chosen words, to determine a set of key points of the lips of the human speaker, to record the positions of the key points on the video data, to cluster various lip shapes of the human speaker into a class of lip shape, to generate a mapping table, including mapping transitions of key points for the class of lip shape to the speaker speaking one of the chosen words, and to generate a frame list based on the mapping table and a speech rate from an audio, wherein generating the frame list includes, defining multiple features from the key points, wherein a feature is a ratio of two dimensions of facial features, and generating all of the tri-phonemes from available video data, including dividing the tri-phonemes into three levels, wherein a first level includes tri-phonemes that are included in data from the video, a second level includes tri-phonemes that can be mapped into the first level based on a phoneme-viseme relation, and a third level includes all of the tri-phonemes that cannot be mapped.

6. The system of claim 5, wherein generating all of the tri-phonemes further comprises, for the first level of tri-phonemes:

splitting available video data into phoneme-level data based on corresponding audio; and classifying the multiple features of each video frame into one class; and obtaining a first level tri-phoneme trajectory describing the trajectory of the key points of a class through the first level tri-phonemes.

7. The system of claim 6, wherein generating all of the tri-phonemes further comprises, for the second level of tri-phonemes:

mapping the tri-phonemes into tri-visemes;

determining all the tri-phonemes that are not included in the first level but can be mapped into the first level through tri-visemes;

copying a class list from the first tri-phoneme to its mapping second tri-phoneme; and obtaining a second level tri-phoneme trajectory describing the trajectory of the key points of a class through the second level tri-phonemes.

8. The system of claim 7, wherein generating all of the tri-phonemes further comprises, for the third level of tri-phonemes, determining all of the tri-phonemes that cannot be mapped.

* * * * *